Sept. 6, 1938.　　　　F. M. KLEMA　　　　2,129,139

SPEED CHANGE MECHANISM

Filed Sept. 21, 1936

Inventor
Frank M. Klema
Fred A. Parsons
Attorney

Patented Sept. 6, 1938

2,129,139

UNITED STATES PATENT OFFICE 2,129,139

SPEED CHANGE MECHANISM

Frank M. Klema, Racine, Wis.

Application September 21, 1936, Serial No. 101,718

10 Claims. (Cl. 74—285)

This invention relates to speed change mechanism and more particularly to a mechanical rate changer in which any speed intermediate the maximum and minimum available speeds may be obtained by suitable adjustment of a controller.

A purpose of the invention is to simplify and improve the structure shown in a co-pending application, Serial No. 92,722, filed July 27, 1936, more particularly to provide greater increased mechanical efficiency for mechanical trains connecting a constant speed drive shaft to effect variable speeds of a driven shaft, and especially where the mechanical trains include a rate changer and a differential device.

A further purpose is generally to simplify and improve the construction and operation of speed change devices.

The same reference characters have been used throughout to indicate the same parts, and in the drawing.

Figure 1:
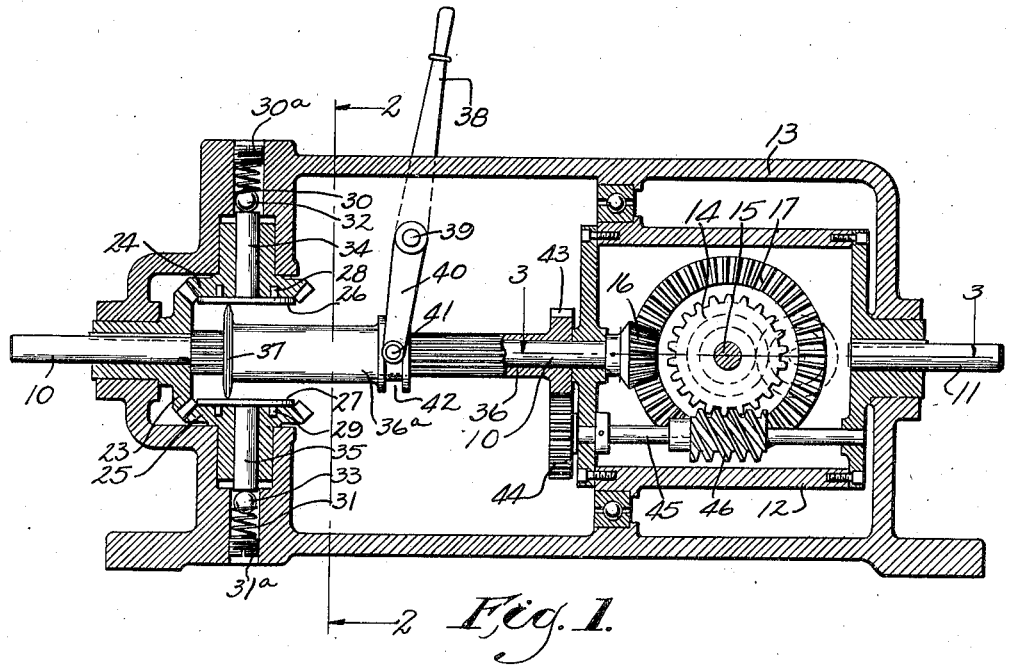
Figure 1 is a vertical section through a speed change device incorporating the invention, taken approximately along line 1—1 of Fig. 2.
Figures 2, 3:
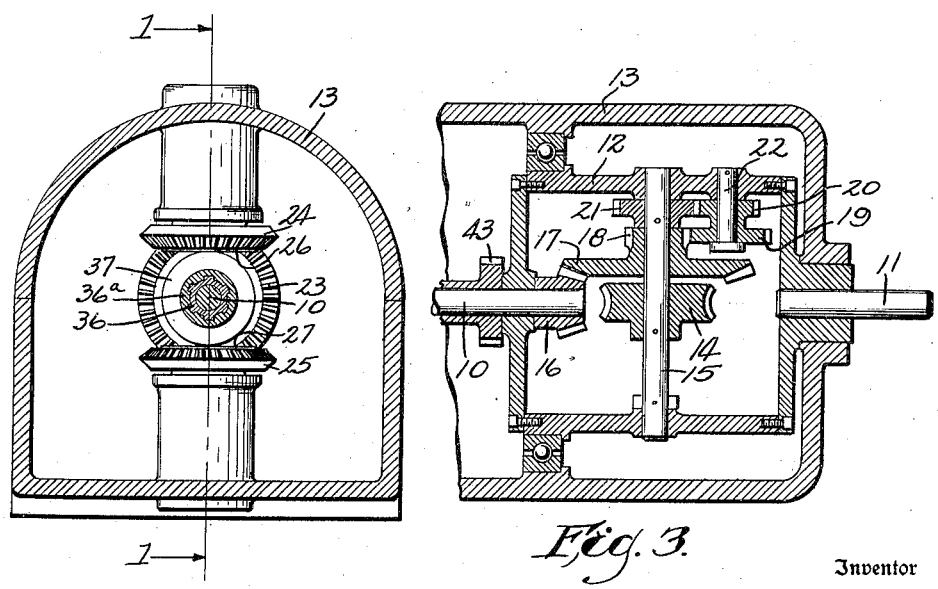
Figure 2 is a transverse section of the same device taken approximately along line 2—2 of Fig. 1.
Figure 3 is a horizontal partial section taken along line 3—3 of Fig. 1.

The device includes a driving shaft 10 and a co-axially driven shaft 11. By the means of mechanism later described, shaft 11 may be driven at either minimum or maximum speed or at any intermediate speed. With the mechanism proportioned as here shown the minimum speed of shaft 11 is zero and the maximum speed is approximately the same as shaft 10. The transmission mechanism connecting shafts 10 and 11 is as follows:

A cage or rotor 12 is journaled in suitable bearings in a housing 13 for rotation co-axially with shafts 10 and 11. A worm wheel 14 is fixed on a shaft 15, the shaft being rotatably mounted in the cage 12, fixed against axial movement, and with its axis intersecting the axis of shafts 10 and 11 at right angles thereto.

Cage 12 is connected to be differentially driven from shaft 10 through a plurality of trains. One of such trains includes a bevel gear 16 fixed on the extended end of shaft 10, a bevel gear 17 meshed with gear 16 and rotatably supported on shaft 15 and a reduction gear train connecting gear 17 with shaft 15 which includes a pinion 18 fixed with gear 17, a gear 19 meshed therewith, a pinion 20 fixed with gear 19 and a gear 21 meshed with gear 20 and fixed with shaft 15, the gear 19 and pinion 20 being rotatably mounted on a stud 22 fixed in the cage 12.

The other train connecting the shaft 10 for driving cage 12 is as follows:

Fixed on shaft 10 is a bevel gear 23 which drives bevel gears 24, 25 in opposite directions. The gevel gears 24, 25 are respectively provided with the friction disks 26, 27, the disks being positively driven from the associated bevel gear by driving lugs such as 28, 29 fixed with the disks and engaging suitable recesses in the gears, the disks being each axially adjustable relative to the associated gear and continuously urged toward one another by springs such as 30, 31 operating through suitable friction reducing elements such as the balls 32, 33 thrusting against the shanks 34, 35 of the friction disks. The spring friction may be adjusted by screws such as 30a, 31a. Carried on shaft 10 but rotatable relative thereto, is a sleeve 36 upon which is slidably keyed an outer sleeve 36a, there being a friction ring or annulus 37 fixed on the sleeve 36a to be peripherally engaged between friction disks 26, 27. The sleeve 36a is axially adjustable, as for instance by hand lever 38 fixed on a shaft 39 carrying a lever 40 having a portion 41 engaging an annular groove 42 fixed on a shaft 45 rotatably mounted in the cage 12 and having fixed thereon a worm 46 engaging the worm wheel 14.

The described construction is such that bevel gear 16 simultaneously urges rotation of worm wheel 14 on its own axis and a bodily rotation thereof together with cage 12 on the axis of cage 12, the rotation of cage 12 being in the same direction as gear 16 and drive shaft 10.

When annulus 37 is shifted to central position, Fig. 1, whereby the annulus and the gear 43 is prevented from rotating, the rotation of cage 12 as described causes a rotation of gear 44 and worm 46 on their own axis in a direction the same as the rotation of drive shaft 10 and cage 12. The direction of thread angle of worm 46 and wheel 14, as here shown, is such that the rotation of the worm 46 just described urges the worm wheel in the same direction about its own axis in which it is urged by the bevel gear 16 and the connecting gear train, and the result is an axial rotation of worm wheel 14 at a rate determined in part by the rotational speed of the worm and in part by the ratio of the worm and wheel. The rate of axial rotation of the worm wheel, determined as just mentioned, in turn determines the rate of rotation of cage 12 and output shaft 11, urged by the drive shaft as previously pointed out. In other words, as previously stated, the drive shaft 10 simultaneously urges axial rotation of the cage 12 and of worm wheel 14, and where the rate of axial rotation of worm wheel 14 is established as just described, whereby to take up a portion of the rotational movement of drive shaft 10, then the rate of axial rotation of cage 12 and output shaft 11 is thereby established as a rate sufficient to take up the remainder of the rotation of drive shaft 10.

Under conditions just described, that is to say where annulus 37 is centrally positioned and therefore stationary, the actual rotational speed of cage 12 and output shaft 11 is determined by the relative ratio of the two trains respectively connecting from the annulus 37 and from drive shaft 10 to the worm wheel 14. The trains obviously may be of such ratio that the portion of rotational speed of shaft 10 which is used in rotation of worm wheel 14 is one half of the speed of shaft 10, in which event the cage 12 and output shaft 11 will be used to rotate at one half the speed of drive shaft 10. In any event the direction of rotation, using gearing as here shown, will be the same for the shaft 10 and output shaft 11.

As the annulus 37 is shifted from central position to the left in Fig. 1, whereby to drive the annulus at increasing speed in the same direction as shaft 10, the annulus urges a rotation of gear 44 and worm 46 on their own axis in a direction opposite to that urged by the rotation of cage 12 as previously described. The speed of axial rotation of worm 46 is then determined by the difference between the two speeds respectively urged by the bodily rotation with cage 12 and by the rotation of the annulus. In other words the faster the annulus rotates in the same direction as shaft 10 the slower will be the axial rotation of the worm 46 and of the worm gear 14, and therefore, the larger will be the amount of the rotational speed of the drive shaft 10 which must be absorbed by increased speed of rotation of the cage 12 and output shaft 11. At some point in the left hand adjustment of the annulus from its central position the axial rotation of the worm will be zero because the two speeds respectively urged by annulus 37 and by bodily rotation of gear 44 about gear 43 are equal and opposite. At that point the worm wheel 14 also is stationary on its own axis and the result is a unitary bodily rotation of all the parts to drive output shaft 11 at the same speed and in the same direction as drive shaft 10.

As the annulus 37 is shifted from central position to the right in Fig. 1, whereby to drive the annulus at increasing speed in the opposite direction to shaft 10, the annulus urges a rotation of gear 44 and worm 46 on their own axis in a direction the same as that urged by the rotation of cage 12 as previously described. The speed of axial rotation of worm 46 is then determined by the sum of the two speeds respectively urged by its bodily rotation with cage 12 and by the rotation of the annulus. In other words the faster the annulus rotates in the direction opposite to shaft 10 the faster the axial rotation of worm 46 and worm wheel 14, and therefore the less will be the amount of the rotational speed of shaft 10 which must be absorbed by the rotation of cage 12. At some point in the right hand adjustment of the annulus from its central position the entire rotational speed of shaft 10 will be absorbed in the rotation of worm wheel 14, and at that point the cage 12 and output shaft 11 will be stationary.

In each of the above described adjustments of the annulus 37 (except when output shaft 11 is stationary) and in all intermediate adjustments, the output shaft 11 is rotating in the same direction as drive shaft 10, and at a speed determined by the adjustment of the annulus. According to the adjustment the output shaft may have any speed within the range of the device, which may be greatly modified by suitable proportioning the trains, and particularly the train connecting the annulus for rotation of worm wheel 14. If desired the trains may be proportioned to pass through the zero output speed for reverse rotation of output shaft 11.

It will be understood that the structure here shown is capable of a variety of modifications, each of which are contemplated as within the scope of the invention, if within the spirit and scope of the claims.

What is claimed is:

1. In a rate change mechanism the combination of a driving shaft, a driven shaft, a rotatable cage connected for rotation of said driven shaft, and a plurality of trains simultaneously connecting said driving shaft for rotation of said cage, one of said trains including said driving shaft, a rate changer, a worm and a worm wheel in series in the order recited, the other of the said trains including said driving shaft, a pair of meshed bevel gears, and speed reducing gearing in the order recited.

2. In a rate change mechanism the combination of a driving shaft, a driven shaft, a rotatable cage connected for rotation of said driven shaft, and a plurality of trains simultaneously connecting said driving shaft for rotation of said cage, one of said trains including said driving shaft, a rate changer, a worm and a worm wheel in series in the order recited, the other of the said trains including said driving shaft, a pair of meshed bevel gears, and speed reducing gearing in the order recited, said rate changer providing frictionally engaged elements relatively adjustable to effect a high speed, a low speed, and a series of intermediate speeds of said cage.

3. In a rate change mechanism the combination of a driving shaft, a driven shaft, a rotatable cage connected for rotation of said driven shaft, a first train connecting said driving shaft for rotation of said cage including in the order recited a rate changer, a meshed worm and worm wheel and a rotatable shaft mounted in said cage for bodily rotation therewith and on an axis transverse to the axis of said cage and intersecting therewith, and a second train connecting said driving shaft and cage including a pair of meshed bevel gears and said axially transverse shaft in the order recited.

4. In a rate change mechanism the combination of a driving shaft, a driven shaft, a rotatable cage connected for rotation of said driven shaft, a first train connecting said driving shaft for rotation of said cage including in the order recited a rate changer, a meshed worm and worm wheel and a rotatable shaft mounted in said cage for bodily rotation therewith and on an axis transverse to the axis of said cage and intersecting therewith, and a second train connecting said driving shaft and cage including a pair of meshed bevel gears, speed reducing gearing, and said axially transverse shaft in the order recited, said rate changer including a pair of frictionally engaged elements relatively adjustable to effect a low speed, a high speed and a series of intermediate speeds of said driven shaft.

5. In a rate change mechanism the combination of a driving shaft, a driven shaft, a rotatable cage connected for rotation of said driven shaft, a first train connecting said driving shaft for rotation of said cage including in the order recited, a rate changer, a meshed worm and worm wheel and a shaft rotatably mounted in said cage for bodily rotation therewith and axially transverse to the cage axis and another train connecting said driving shaft for rotation of said cage including meshed bevel gears, speed reducing gearing and said axially transverse shaft in the order recited.

6. In a rate change mechanism the combination of a driving shaft, a driven shaft, a rotatable cage connected for rotation of said driven shaft, a first train connecting said driving shaft for rotation of said cage including in the order recited, a rate changer, a meshed worm and worm wheel and a shaft rotatably mounted in said cage for bodily rotation therewith and axially transverse to the cage axis, and another train connecting said driving shaft for rotation of said cage including meshed bevel gears, speed reducing gearing and said axially transverse shaft in the order recited, said rate changer including frictionally engaged elements relatively adjustable for effecting a high speed, a low speed, and a series of intermediate speeds of said driven shaft.

7. In a rate change mechanism the combination of a driving shaft, a driven shaft, a rotatable cage connected for rotation of said driven shaft, a shaft mounted in said cage for bodily rotation therewith and for rotation on an axis transverse to the cage axis and intersecting therewith, a first train connected with said driving shaft including a rate changer and elements irreversibly connecting said rate changer to drive said transverse shaft, and a second train connecting said driving shaft and transverse shaft, said second train being of a form for transmission of motion in either direction therethrough.

8. In a rate change mechanism the combination of a driving shaft, a driven shaft, a rotatable cage connected for rotation of said driven shaft, a shaft mounted in said cage for bodily rotation therewith and for rotation on an axis transverse to the cage axis and intersecting therewith, a first train connected with said driving shaft including a rate changer and elements irreversibly connecting said rate changer to drive said transverse shaft, and a second train connecting said driving shaft and transverse shaft and including meshed bevel gears and speed reducing gearing, said rate changer including frictionally engaged elements relatively adjustable for effecting a high speed, a low speed, and a series of intermediate speeds of said driven shaft.

9. In a rate change mechanism the combination of a driving shaft, a driven shaft, a first train including said driving shaft, a rate changer and a plurality of meshed transmission elements of a form effecting an irreversible driving connection, a second train including said driving shaft, gearing of a form to transmit motion in either direction therethrough and a shaft having an axis transverse to the axis of the driving shaft and intersecting therewith, and driving means connecting each of said trains to said driven shaft.

10. In a rate change mechanism the combination of a driving shaft, a driven shaft, a first train including said drive shaft, a rate changer and a plurality of meshed transmission elements of a form effecting an irreversible driving connection, a second train including said driving shaft, bevel gearing, speed reducing gearing and a shaft having an axis transverse to the axis of said driving shaft and intersecting therewith, and driving means connecting each of said trains to said driven shaft, said rate changer including frictionally engaged elements relatively adjustable to effect a high speed, a low speed and a series of intermediate speeds of said driven shaft.

FRANK M. KLEMA.